United States Patent [19]

Kornhauser

[11] Patent Number: 4,521,174
[45] Date of Patent: Jun. 4, 1985

[54] ADJUSTABLE DOUGH MANIPULATOR

[76] Inventor: Murray Kornhauser, 620 Argyle Rd., Wynnewood, Pa. 19096

[21] Appl. No.: 582,807

[22] Filed: Feb. 23, 1984

Related U.S. Application Data

[63] Continuation of Ser. No. 419,132, Sep. 17, 1982, abandoned, which is a continuation-in-part of Ser. No. 279,226, Jun. 30, 1981, abandoned.

[51] Int. Cl.³ ............................................. A21C 1/08
[52] U.S. Cl. .................................. 425/194; 425/367; 425/374; 425/458
[58] Field of Search ............... 425/194, 367, 374, 458; 29/450

[56] References Cited

U.S. PATENT DOCUMENTS

| 39,916 | 9/1863 | Heissenbuttel | 425/374 |
|---|---|---|---|
| 1,452,742 | 4/1923 | Johnston | 225/374 |
| 1,556,887 | 10/1925 | Winters | 425/367 |
| 2,181,666 | 1/1939 | Molin | 425/374 |
| 2,367,657 | 1/1945 | Boersma | 29/450 |
| 2,521,982 | 9/1950 | Kors | 425/374 |
| 4,009,857 | 3/1977 | Delmas | 425/374 |
| 4,081,169 | 3/1978 | Lauter | 425/374 |

FOREIGN PATENT DOCUMENTS

| 153785 | 7/1958 | Fed. Rep. of Germany | 425/194 |
|---|---|---|---|
| 890221 | 2/1944 | France | 425/194 |
| 1123580 | 9/1956 | France | 425/194 |
| 1127405 | 12/1956 | France | 425/194 |
| 1171273 | 1/1959 | France | 425/194 |
| 413971 | 4/1947 | Italy | 425/194 |
| 14320 | 9/1900 | Sweden | 425/194 |
| 91738 | 3/1938 | Sweden | 425/194 |
| 12631 | 6/1896 | Switzerland | 425/194 |
| 82590 | 4/1919 | Switzerland | 425/194 |
| 242147 | 9/1946 | Switzerland | 425/194 |
| 330111 | 7/1958 | Switzerland | 425/194 |

*Primary Examiner*—James Derrington
*Attorney, Agent, or Firm*—Woodcock, Washburn, Kurtz, Mackiewicz & Norris

[57] ABSTRACT

A dough manipulator adapted for manually controlling the thickness of dough is disclosed which comprises a roller with handles and means for maintaining the roller at a predetermined height above a surface, wherein the means for maintaining the height of the roller is placed at a predetermined distance from the ends of the roller. Height maintaining means include spacer rings positioned on the roller or spacer strips positioned on the surface. The manipulator is used in conjunction with a surface which is substantially flat.

1 Claim, 7 Drawing Figures

ADJUSTABLE DOUGH MANIPULATOR

This application is a continuation of application Ser. No. 419,132, filed Sept. 17, 1982, now abandoned, which is a continuation-in-part of application Ser. No. 279,226, filed June 30, 1981, now abandoned.

BACKGROUND AND OBJECTS OF THE INVENTION

This invention relates to an adjustable apparatus and method of use for manually controlling the thickness of dough.

A variety of methods and apparatuses have been developed for processing materials such as plastics or dough and controlling the thickness of these materials during processing. Many of these involve automated systems and comprise a plurality of rollers or pairs of rollers. Some of these also include means for controlling the width and thickness of the material being processed. See, e.g. U.S. Pat. Nos. 2,534,296 to Pike et al; 2,835,212 to Keathley, Sr. et al; 2,960,044 to Anetsberger; 3,017,665 to Dasher et al; and 3,055,318 to Engels. Other devices used with rolling pins include means for cutting dough. See e.g. U.S. Pat. Nos. 3,994,652; 3,299,835; and 2,968,261.

Dough rolling machines, sometimes called sheeters, can roll dough to the desired thickness by adjusting the spacing between the bearings or journals, whereby the space between the surfaces of a pair of rollers are adjusted to give dough the desired thickness. Some of these sheeters also use a roller having flanges which overlap the ends of a second roller to control the width of the dough.

For an individual cook desiring to process limited quantities of dough, there is no easy and practical way of controlling the thickness of the dough. This inability to consistently obtain a uniform thickness may cause problems in duplicating recipes and may result in the overcooking or undercooking of dishes having crusts (e.g. pies, quiches, etc.). Thus, it is an object of this invention to provide an apparatus adaptable for use on a home scale for controlling the thickness of dough. It is a further object of this invention to provide dough manipulating apparatuses that are manually adjustable. It is another object of this invention to provide dough manipulating apparatuses that have easily changeable parts. It is a further object still to provide dough manipulating apparatuses which are easily portable. It is yet another object to provide dough manipulating apparatuses which make it possible for authors of recipes to specify dough thickness more precisely than heretofore, so that better results may be achieved in using these recipes because of improved uniformity and reproducibility. These and other objects of the invention will be apparent from the following description of the invention.

BRIEF DESCRIPTION OF THE DRAWINGS

This invention provides novel apparatuses and methods for manually processing dough on a home scale in order to form dough of a uniform thickness.

DETAILED DESCRIPTION OF THE DRAWINGS

Figure 1:
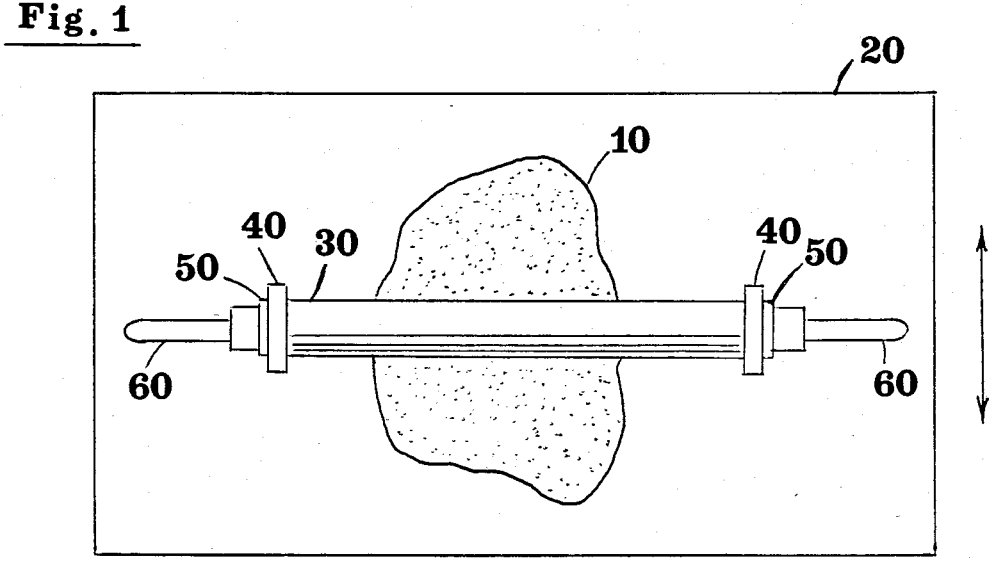
FIG. 1 shows a top plan view of a dough manipulator constructed in accordance with this invention wherein the adjustable elements fit onto the roller.
Figure 2:
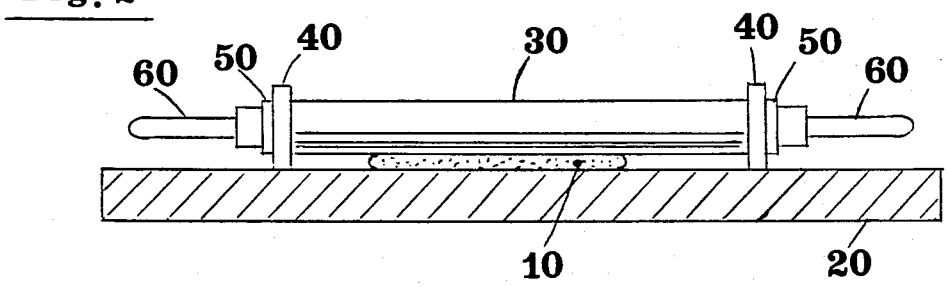
FIG. 2 shows a side view of the apparatus of FIG. 1.

FIGS. 1 and 2 show a dough manipulator made in accordance with this invention. The manipulator comprises a roller 30 with handles 60, and spacer rings 40, and is used in conjunction with a flat surface 20, e.g. a board. The spacer rings 40 are selected according to the thickness of dough desired and are positioned on roller 30 by sliding the spacer rings 40 over the roller 30 and positioning each ring at a preselected distance from the end of the roller 30 such that each ring maintains contact with the roller. Threaded collars 50 may be used to maintain the spacer rings 40 in position on roller 30. Spacer ring sets may be made of any suitable non-toxic material, e.g. wood or hard plastic. Spacer ring sets may be provided with thicknesses most commonly referred to in cookbooks, e.g., $\frac{1}{8}$ inch, $\frac{1}{4}$ inch, $\frac{1}{3}$ inch, $\frac{1}{2}$ inch, etc. To obtain a particular thickness, one places the appropriate size spacer ring on either side of the roller 30 by slidably positioning spacer rings 40 on the roller. In operation, dough 10 is placed on flat surface 20 and the manipulator is rolled back and forth across dough 10 in the direction of the arrows in FIG. 1 until the dough cannot be flattened further. The final thickness of the dough will be equal to the radius of spacer ring 40 minus the radius of roller 30.

Alternatively, spacer rings 40 are fixedly attached to threaded collars 50 so that spacer rings 40 remain in a fixed position during rolling.

Figure 3:
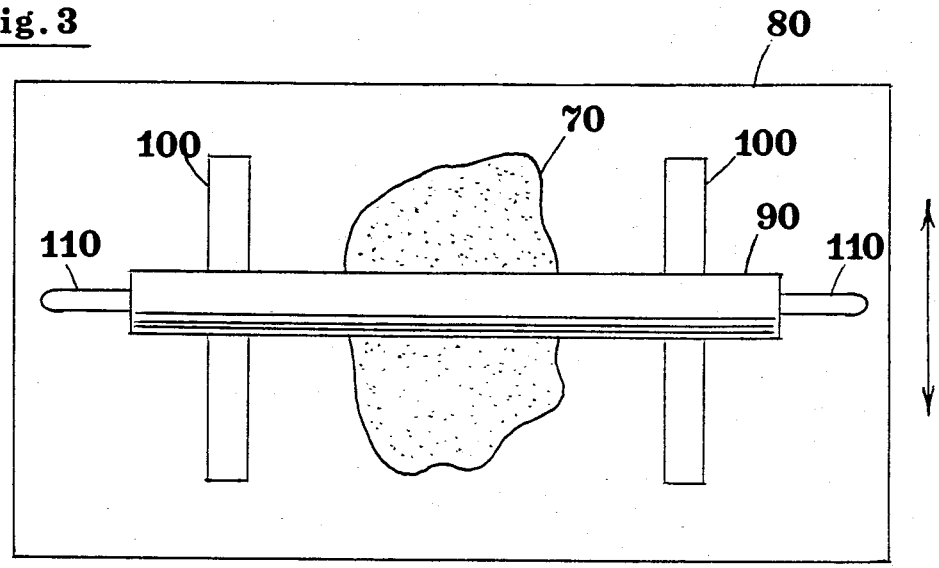
FIG. 3 shows a top plan view of an alternate embodiment of a dough manipulator constructed in accordance with this invention, wherein the adjustable elements comprise spacer strips which are not attached to the roller.
Figure 4:
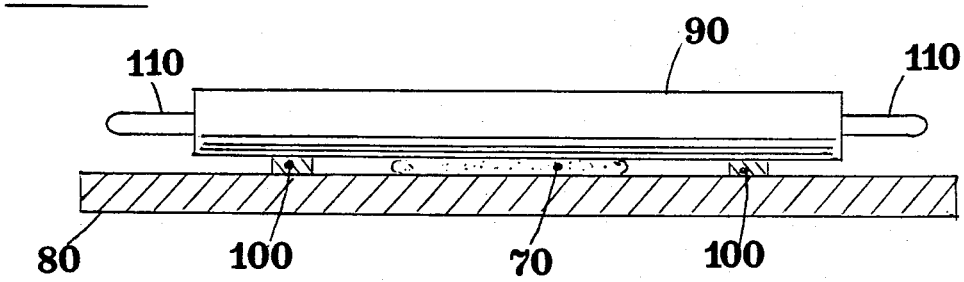
FIG. 4 shows a side view of the apparatus of FIG. 3.

FIGS. 3 and 4 show an alternative embodiment of a dough manipulator made in accordance with this invention. The manipulator comprises a roller 90 with handles 110, and spacer strips 100. The manipulator is used in conjunction with a flat surface 80. The spacer strips are selected according to the thickness of dough desired. Spacer strip sets may be provided with thicknesses most commonly referred to in cookbooks. To obtain a particular thickness, the spacer strips with the appropriate thickness are selected and are fastened to the flat surface 80 a distance apart not greater than the length of the roller. In operation, a piece of dough 70 is placed on a flat surface 80 (e.g. a board or a table top). The manipulator is rolled back and forth across dough 70 in the direction of the arrows in FIG. 3 until the dough cannot be flattened further. The final thickness of the dough will be equal to the thickness of the spacer strips.

Figure 5:
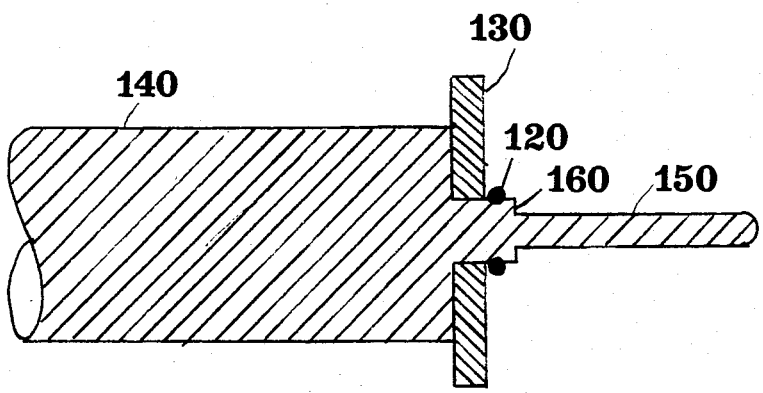
FIG. 5 shows a partial cross sectional side view of a dough manipulator constructed in accordance with this invention wherein the adjustable elements are held in place by an elastic member.

FIG. 5 shows an embodiment of this invention in which an elastic member 120 such as an O-ring is used to maintain each of the spacer rings 130 in a fixed position during rolling. A O-ring is preferred because it has sufficient height to hold the spacer rings in position without requiring several thicknesses and is also easily handleable. In this embodiment, roller 140 with handles 150 is preferably constructed with shoulders 160 on which spacer rings 130 are positioned. A stretchable and manually removable elastic member 120 is then positioned on each shoulder 160 to hold each spacer ring 130 in position against the body of roller 140. The elastic member is preferably seated in a groove (not shown).

Figure 6:
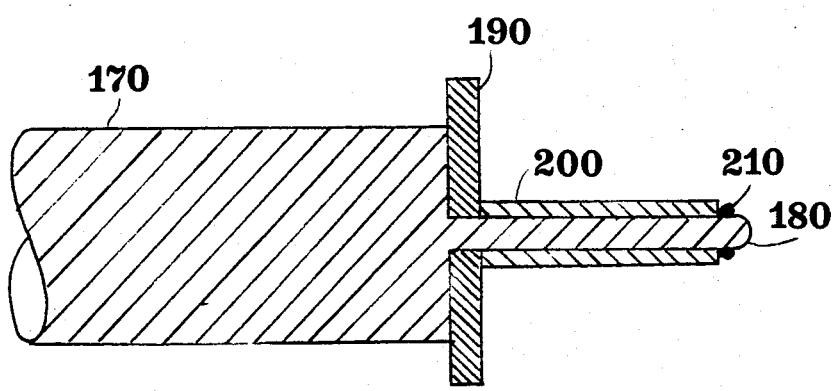
FIG. 6 shows a partial cross sectional side view of a fourth embodiment of the invention in which a loose fitting cylinder is positioned between each adjustable element and an elastic member.

FIG. 6 shows an embodiment of a dough manipulator constructed in accordance with this invention. Roller 170 has been constructed with a handle 180. Spacer rings 190 have been positioned next to the roller 170. Over each handle 180, a loose fitting cylinder 200 has been positioned. Each cylinder 200 is held in place by an elastic member 210, e.g., an O-ring. The elastic member is preferably seated in a groove (not shown). This embodiment provides an alternate handle structure for maintaining the spacer rings on the roller which some users may find more comfortable while exerting pressure against the spacer rings.

Figure 7:
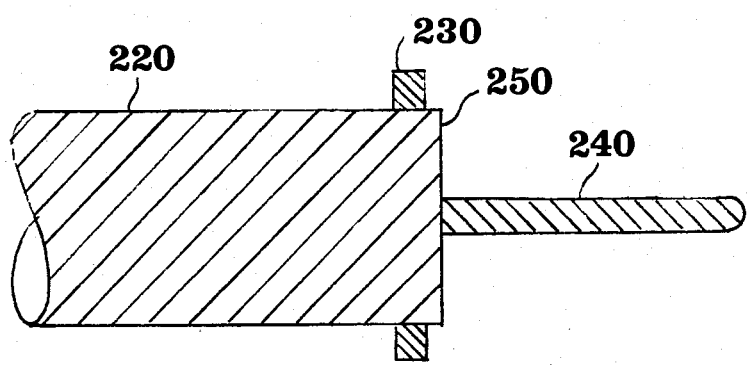
FIG. 7 shows a partial cross sectional side view of a fifth embodiment of the invention in which the spacer rings comprise elastic members of a preselected flexibility which are stretched over the roller.

FIG. 7 shows an embodiment of this invention in which the roller 220 with handles 240 has positioned thereon spacer rings each comprising an elastic member 230. Elastic member 230 is constructed of a suitable stretchable elastomeric material of a preselected flexibility and is positioned inwardly from the edge 250 of roller 220 at a preselected distance. The elastic members positioned at each end of the roller may be made of a suitable nontoxic elastic material, for example, various types of rubbers. The elastomeric material should be selected so that it stretches sufficiently to fit over rollers of various sizes but yet is not so deformable that rolling pressures appreciably reduce the thickness. Although a small amount of stretch is required to provide sufficient friction to prevent the spacer rings from sliding off the roller during usage, an excessive amount of stretch tends to reduce the cross-sectional dimensions of the spacer rings and thereby reduces the thickness of dough below its intended thickness. Amounts of stretch not exceeding approximately 25 percent of the roller diameter will not produce an objectionable degree of reduction in dough thickness. Elastomers with Shore A Durometer readings in the 50–70 range are flexible enough to permit easy stretching, but not so soft that the rolling pressures would deform the spacer rings appreciably and thereby reduce the dough thickness. These elastic spacer rings may be held in place on roller 220 either by means of the friction between the surface of contact between the roller and the spacer ring or by means of a threaded collar or second elastic band, e.g. an O-ring.

I claim:

1. A dough manipulator adapted for manually controlling the thickness of dough comprising a roller with handles, and means for maintaining said roller at a predetermined height above a substantially flat surface, said means consisting of two spacer rings positioned at the ends of said roller;

said means for maintaining each spacer ring in position consisting of an elastic member seated in a groove at a predetermined distance from the end of said roller.

* * * * *